United States Patent
Nakamura

(10) Patent No.: US 7,054,699 B2
(45) Date of Patent: May 30, 2006

(54) PROCESS MANAGEMENT SYSTEM AND PRODUCTION MANAGEMENT SYSTEM

(75) Inventor: Kazuo Nakamura, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/073,588

(22) Filed: Mar. 8, 2005

(65) Prior Publication Data

US 2005/0203653 A1   Sep. 15, 2005

(30) Foreign Application Priority Data

Mar. 9, 2004   (JP) ............................. 2004-065580

(51) Int. Cl.
G06F 19/00 (2006.01)

(52) U.S. Cl. .............................. 700/95; 700/99; 705/8; 235/385

(58) Field of Classification Search ................ 235/385; 700/95, 97, 99; 705/8
See application file for complete search history.

(56) References Cited

U.S. PATENT DOCUMENTS

| | | | |
|---|---|---|---|
| 5,478,990 A | 12/1995 | Montanari et al. | |
| 6,104,966 A | 8/2000 | Haagensen | |
| 6,148,307 A | 11/2000 | Burdick et al. | |
| 6,231,435 B1 | 5/2001 | Pilger | |
| 6,341,240 B1 * | 1/2002 | Bermon et al. | 700/97 |
| 6,346,885 B1 | 2/2002 | Curkendall | |
| 6,708,070 B1 * | 3/2004 | Yasuda et al. | 700/97 |
| 6,892,943 B1 | 5/2005 | Nakamura | |
| 2001/0029996 A1 | 10/2001 | Robinson | |
| 2002/0004366 A1 | 1/2002 | Thorvaldsson et al. | |
| 2002/0015876 A1 | 2/2002 | Saito et al. | |
| 2002/0095348 A1 * | 7/2002 | Hiroshige et al. | 705/26 |
| 2003/0000628 A1 | 1/2003 | Weder | |

(Continued)

FOREIGN PATENT DOCUMENTS

| | | |
|---|---|---|
| GB | 2289963 | 6/1995 |
| GB | 2372346 | 8/2002 |
| JP | 10-029140 | 2/1998 |
| JP | 2001-56706 | 2/2001 |
| JP | 2001-56707 | 2/2001 |
| WO | WO 01/91565 | 12/2001 |

OTHER PUBLICATIONS

"Traceability in the Food Chain," Announcement Food Standards Agency, Mar. 2002, pp. 1-51.

(Continued)

*Primary Examiner*—Leo Picard
*Assistant Examiner*—Douglas S. Lee
(74) *Attorney, Agent, or Firm*—Greenblum & Bernstein, P.L.C.

(57) ABSTRACT

A process management system has a plurality of processes, each process producing a group of products from at least one kind of parts by applying a predetermined operation thereto. A plurality of processes are hierarchically connected so that a final product is obtained from a plurality of parts. Part data and production data is generated. The part data is data related to connection information, and the part data includes at least usage time data. The product data is data related to the connection information and including production time data. A ratio calculating system is provided to calculate a ratio of the products obtained with use of the parts to the group of products in accordance with the production time data and the usage time data.

9 Claims, 7 Drawing Sheets

U.S. PATENT DOCUMENTS

2003/0154146 A1     8/2003     Muro et al.
2004/0078289 A1     4/2004     Barid
2004/0093101 A1*    5/2004     Torii et al. .................... 700/95

OTHER PUBLICATIONS

An article by DELCUVELLERIE, entitled "Gestion De Procedes <<Batch >> et Tracabilite," Revue Generale de L'electricite, No. 5, May 1, 2004, pp. 39-43.

An article published by Oracle, entitled "Inventory Management User's Guide—Chapter 11: Inventory Inquiries," Oracle Process Manufacturing, vol. 1, pp. 11-1 to 11-67 (Sep. 2001).

An article published by Orthogon GmbH, entitled "IKS—Integrated Kanban System, Introduction (version 2.2)," Integrated Kanban System, pp. 1-55 (Apr. 9, 2001).

English language abstract of JP 10-029140.

English Language Abstract of JP 201-56706.

U.S. Appl. No. 10/951,703 to Nakamura, filed on Sep. 29, 2004.

English language Abstract of JP2001-56707.

* cited by examiner

FIG.7A

| a1 | |
|---|---|
| PRODUCT DATA | PART DATA |
| $D_1 \sim D_4$ | |
| $T_1$ | |

FIG.7B

| a1 | |
|---|---|
| PRODUCT DATA | PART DATA |
| $D_1 \sim D_5$ | |
| $T_1, T_2$ | |

FIG.7C

| a1 | |
|---|---|
| PRODUCT DATA | PART DATA |
| $D_1 \sim D_5$ | |
| $T_1 \sim T_4$ | |

FIG.8A

| a1 | |
|---|---|
| PRODUCT DATA | PART DATA |
| | |
| | $T_5$ |

FIG.8B

| a1 | |
|---|---|
| PRODUCT DATA | PART DATA |
| | $D_6, D_7$ |
| | $T_5 \sim T_7$ |

FIG.8C

| a1 | |
|---|---|
| PRODUCT DATA | PART DATA |
| | $D_6 \sim D_{11}$ |
| | $T_5 \sim T_8$ |

| a1 | |
|---|---|
| PRODUCT DATA | PART DATA |
| $D_1 \sim D_5$ | $D_6 \sim D_{11}$ |
| $D_1 \sim D_4$ | $D_5 \sim D_8$ |

PROCESS MANAGEMENT SYSTEM AND PRODUCTION MANAGEMENT SYSTEM

BACKGROUND OF THE INVENTION

The present invention relates to a process management system and a production management system which employs the process management system.

Conventionally, when a product is produced in a production line, various parts are sequentially assembled with respect to a main body of the product which flows along the line from its upstream side to downstream side.

The applicant has suggested a production management system with which a manufacturing management can be carried out easily and a traceability function is improved. Such a production management system is disclosed in Japanese Patent Provisional Publication No. P2001-56706A. According to the disclosure of this publication, each part of the product is treated as a product manufactured in another manufacturing facility. Then, a "process" is defined as receiving a part (i.e., a product manufactured at each facility) and manufacturing another product (i.e., another part including the received part). The process of manufacturing the final product is defined by a hierarchically-connected plurality of "processes".

Recently, demand has increased for the manufacturing management system as described above, as well as similar systems dealing with physical entities such as parts of a product, the final product, food products such as meat, and the like. Additionally, demand exists for the management system as described above to deal with incorporeal entities such as economic management, company management and distribution management.

However, enhancement of a traceability function is desired for the various management systems, including those that deal with physical entities and incorporeal entities.

SUMMARY OF THE INVENTION

The present invention is advantageous in that an improved management system is provided, with which waste (in the system for corporeal entities) or malfunctions (in the system for incorporeal entities) can be judged efficiently in comparison with conventional management systems.

According to an aspect of the invention, there is provided a process management system configured to have a plurality of processes, each process producing a group of products from at least one kind of parts by applying a predetermined operation, the plurality of processes being hierarchically connected so that a final product is obtained from a plurality of parts. The process management system is provided with a data generating system that generates part data and product data, the part data being data related to connection information representing a connection between an upstream process and a downstream process, the part data including at least usage time data representing a time the part is used in the downstream process for obtaining the product of the downstream process, the product data being data related to the connection information and including production time data representing a time having been consumed for obtaining the product. The process management system is further provided with a ratio calculating system that calculates a ratio of the products obtained with use of the parts to the group of products in accordance with the production time data and the usage time data.

According to another aspect of the invention, a process management system is configured to have a plurality of processes, each process producing a group of products from a plurality of kinds of parts by applying a predetermined operation, the plurality of processes being hierarchically connected so that a final product is obtained from a plurality of parts. The process management system is provided with a data generating system that generates part data and product data, the part data being data related to connection information representing a connection between an upstream process and a downstream process, the part data including at least usage times data respectively representing times the plurality of kinds of parts are used in the downstream process for obtaining the product of the downstream process, the product data being data related to the connection information and including production time data representing a time having been consumed for obtaining the product. Further, the process management is provided with a ratio calculating system that calculates ratios of the products obtained with use of the plurality of kinds of parts to the group of products, respectively, in accordance with the production time data and the usage time data.

Optionally, the part data may include property data representing properties of the plurality of kinds of parts, respectively.

Further optionally, the product data may include property data representing a property of the product.

Still optionally, the process management system may further include a designating system operable by an operator to designate a product, and the ratio calculating system may be configured to calculate a ratio of the designated products obtained with use of each of the plurality of kinds of parts to the group of the designated products.

According to another aspect of the invention, there is provided a process management system configured to have a plurality of processes, each process producing a group of products from at least one kind of parts by applying a predetermined operation, the plurality of processes being hierarchically connected so that a final product is obtained from a plurality of parts. The process management system is provided with a data generating system that generates part data and product data, the part data being data related to connection information representing a connection between an upstream process and a downstream process, the part data including at least a usage start time data representing a time at which the downstream process starts using the part for obtaining the product of the downstream process and a usage end time data representing a time at which the usage of the parts in the downstream process is finished, the product data being data related to the connection information and including production start time data representing a time at which the downstream process starts obtaining the product and production end time data representing a time at which the downstream process finishes obtaining the product. The process management system further includes a ratio calculating system that calculates a ratio of the products obtained with use of the parts to the group of products in accordance with the production start time data, end time data, usage start time data and usage end time data.

BRIEF DESCRIPTION OF THE ACCOMPANYING DRAWINGS

FIG. 1 shows a transfer of a "box" among processes in a process management system according to an embodiment of the invention;

FIG. 2 schematically shows a relationship among processes of the process management system according to the embodiment;

FIG. 3 schematically shows a configuration of the process management system according to the invention;

FIGS. 7A–7C show tables schematically illustrating management data;

FIGS. 8A–8C show tables schematically illustrating management data;

DETAILED DESCRIPTION OF THE EMBODIMENT

Referring now to the accompanying drawings, a process management system according to an embodiment of the invention will be described in detail. It should be noted that the process management system is for managing processes of a manufacturing line in which corporeal entities are handled. However, the invention should not be limited to such a system, but can be applicable to a management system handling incorporeal entity. In this regards, "parts", "objects" and the like referred to in the description as corporeal entities should be considered to include incorporeal entities.

The process management system according to an embodiment of the invention is for a system that manages an entire manufacturing line consisting of a plurality of processes. In this system, the term "process" is defined as a functional unit of receiving a part and manufacturing a product. It should be noted that the "product" is an object produced in the "process" and is not necessarily a final product of the entire manufacturing process. In that sense, the "process" also implies manufacturing equipment provided at a predetermined area of a facility, a storage for storing a part or product, a manufacturing operation to manufacture a product from parts, and the like. The entire system for manufacturing the final product can be expressed with a model having a tree structure (or hierarchical structure) including hierarchically connected plurality of "processes" (hereinafter, the double quotation marks will be omitted).

The processes are connected in a predetermined order. As is appreciated from the definition, each process uses a part output by a previous process to form a product (which could be a part for the succeeding process), and output the thus formed product to a succeeding process. Hereafter, reception of a part from the previous process will be expressed by a term "carry-in " and transfer of a product to the succeeding process will be expressed by a term "carry-out". Typically, for the carry-in and carry-out, a box is used. That is, the parts/products are stored in a box by a predetermined number (e.g., several tens or hundreds) and transferred from a previous process to a next process. On each box, ID information is provided so that each box can be distinguished from other boxes. Typically, as the ID information, a bar code representing the ID information of the box is adhered.

It is preferable that individual boxes are identified from the ID information. However, as will be described later, each box is transferred between two predetermined processes. Therefore, as an alternative, the ID information may be configured such that a plurality of boxes transferred between two predetermined processes can be distinguished from each other.

Generally, the processes of the process management system include storages, which include parts carry-in storage, using parts storage, produced product storage and product carry-out storage.

Figure 1:
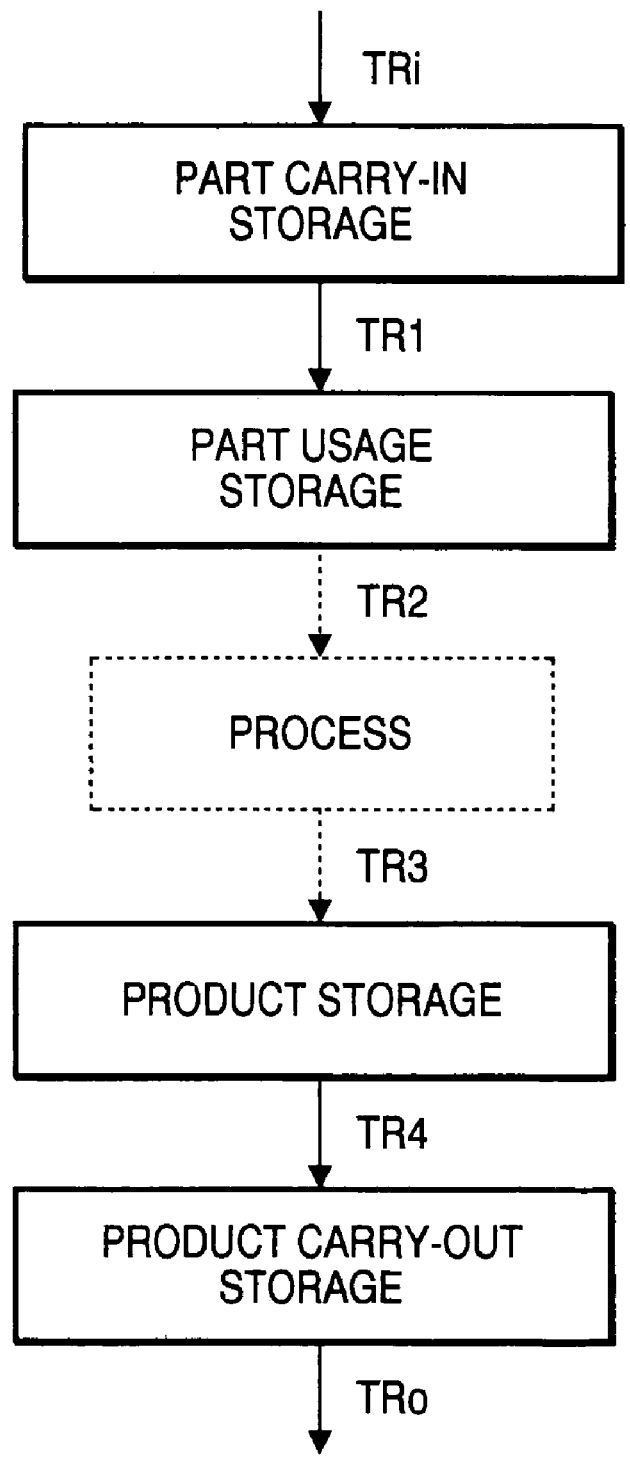

FIG. 1 shows transfer of the parts/products among the storages within each process. Firstly, from a previous process, a box containing products formed in the previous process arrives (indicated by arrow TRo). Then, an operator of the current process stores the received box in the parts carry-in storage. When the product is to be formed in the current process, the operator picks up necessary ones of boxes stored in the parts carry-in storage and moves the same to the using parts storage (TR1). The operator uses the parts in the boxes at the using parts storage to form the product (TR2). The formed products are sequentially stored in another box for containing the products in the current process. When the formation of the products is completed or the box is filled with the products, the operator transfers the box to the produced product storage (TR3). The produced products are to be transferred to the succeeding process, and for this purpose, the operator selects one of the boxes stored in the produced product storage and moves the same to the product carry-out storage (TR4). The box transferred to the product carry-out storage is immediately carried out to the succeeding process (i.e., to the parts carry-in storage of the succeeding process).

Figure 2:
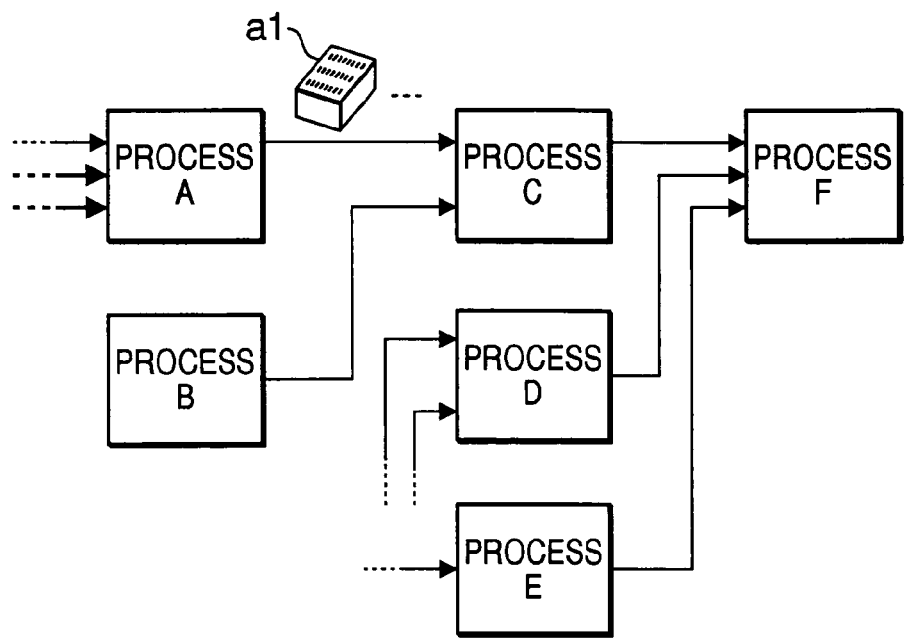

FIG. 2 schematically shows a relationship among processes of the process management system according to the embodiment. In FIG. 2, among a plurality of processes, six processes (processes A through F) are schematically shown. As a plurality of processes are carried out in the predetermined order, the final product is produced.

In FIG. 2, process C receives a product produced in process A and a product produced in process B as parts for process C. Then, process C carries out predetermined operations (e.g., assembling, modifying etc.) to produce a product of process C, which is carried out to process F. As shown in FIG. 2, process F receives the products of processes C, D and E as parts of process F, and produces a product of process F. In this example shown in FIG. 2, the product of process F is the final product of the entire system.

Figure 3:
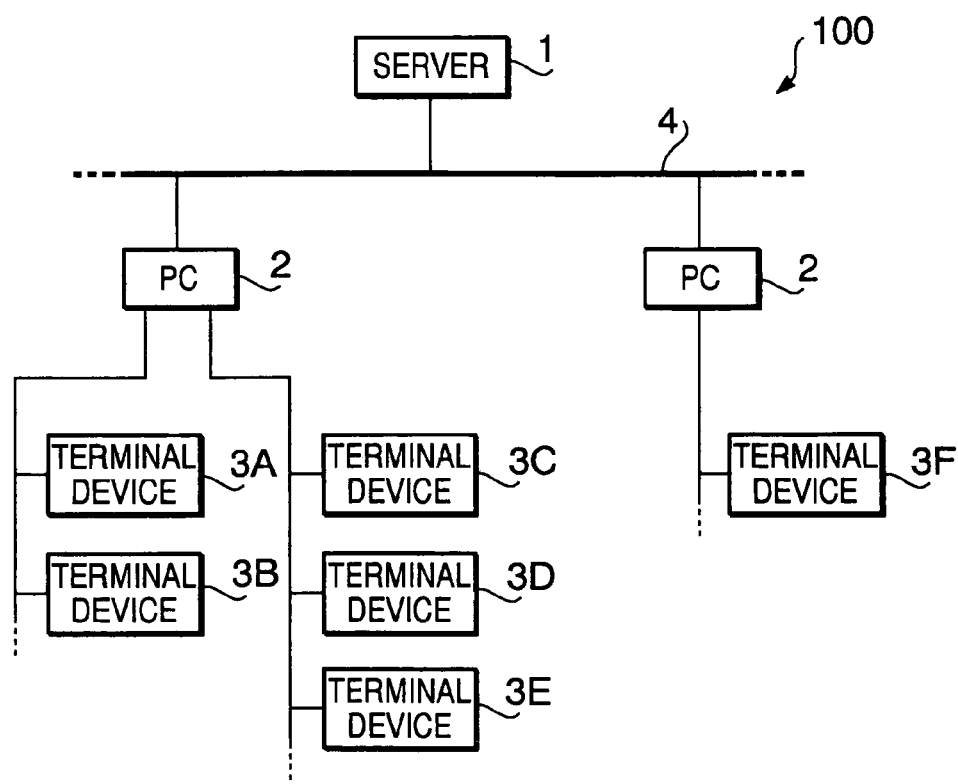

FIG. 3 schematically shows a configuration of the process management system 100 according to the invention. The process management system is for managing each process of the above-described manufacturing system.

As shown in FIG. 3, the process management system 100 includes a server 1, a plurality of personal computers (hereinafter, referred to as PCs) 2 which are connected to the server 1 through a network (e.g., LAN 4). A plurality of terminals 3A–3F are connected with the PCs 2. The terminals 3A–3F are arranged in correspondence with the above-described processes A–F. It should be noted that the configuration of the process management system shown in FIG. 3 is only an exemplary configuration and various modifications could be available.

Now, the serer 1, PC 2 and terminals 3A–3F will be described in detail.

Figure 4:
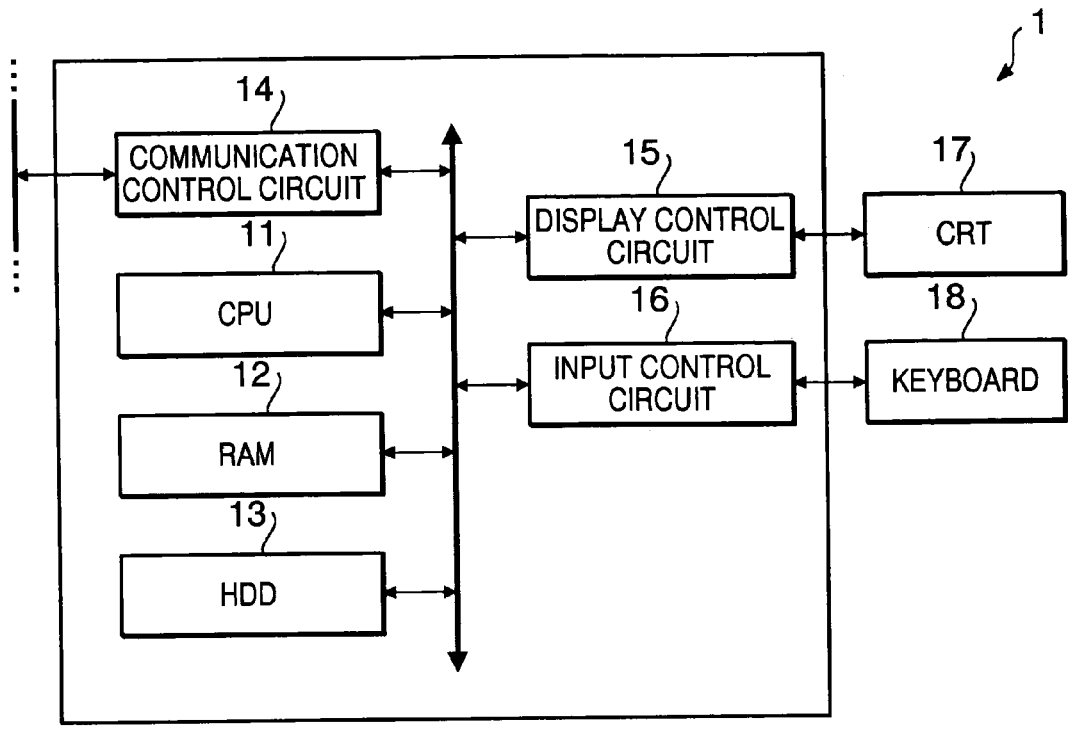
FIG. 4 is a block diagram showing a configuration of a server employed in the process management system according to the embodiment of the invention.

FIG. 4 is a block diagram showing a configuration of a server 1 employed in the process management system 100 shown in FIG. 3. The server 1 has a CPU (Central Processing Unit) 11, a RAM (Random Access Memory) 12, an HDD (Hard Disk Drive) 13, a communication contro91 circuit 14, a display control circuit 15 and input control circuit 16, which are interconnected through a bus. The server 1 further includes a CRT 17 connected with the display control circuit 15 and keyboard 18 connected with the input control circuit 16. The server 1 is connected to the LAN 4 via the communication control circuit 14.

The HDD 13 stored various programs to be executed by the CPU 11. The programs stored in the HDD 13 include an OS (operating system) and database program. Further, the HDD 13 stores management data, which contains a plurality of pieces of data related to links corresponding to connections among the processes. The link is connection information inherently contained in respective processes, and corresponds to the ID information assigned to each box.

The CPU 11 retrieves programs stored in the HDD 13, develops the same in a predetermined area of the RAM 12 and executes the same. The CPU 11 controls the display control circuit 15 to display images on the CRT 17 to show necessary information to the operator. As the operator operates the keyboard 18, the CPU 11 detects the input keys via the input control circuit 16 and carries out corresponding operation. As will be described later, when a defective product is produced in the process, the operator can instructs the server 1 to execute a defect product tracing operation by inputting a predetermined command through the keyboard 18.

Each PC 2 has substantially the same configuration as the server 1. Each PC 2 is connected to the server 1 through the LAN 4. The PC 2 carries out the overall control of the terminal devices connected to respective PCs 2. For example, the left-hand side PC 2 in FIG. 2 is connected with the terminal devices 3A–3E through the LAN 4, and carries out the overall control thereof.

Figure 5:
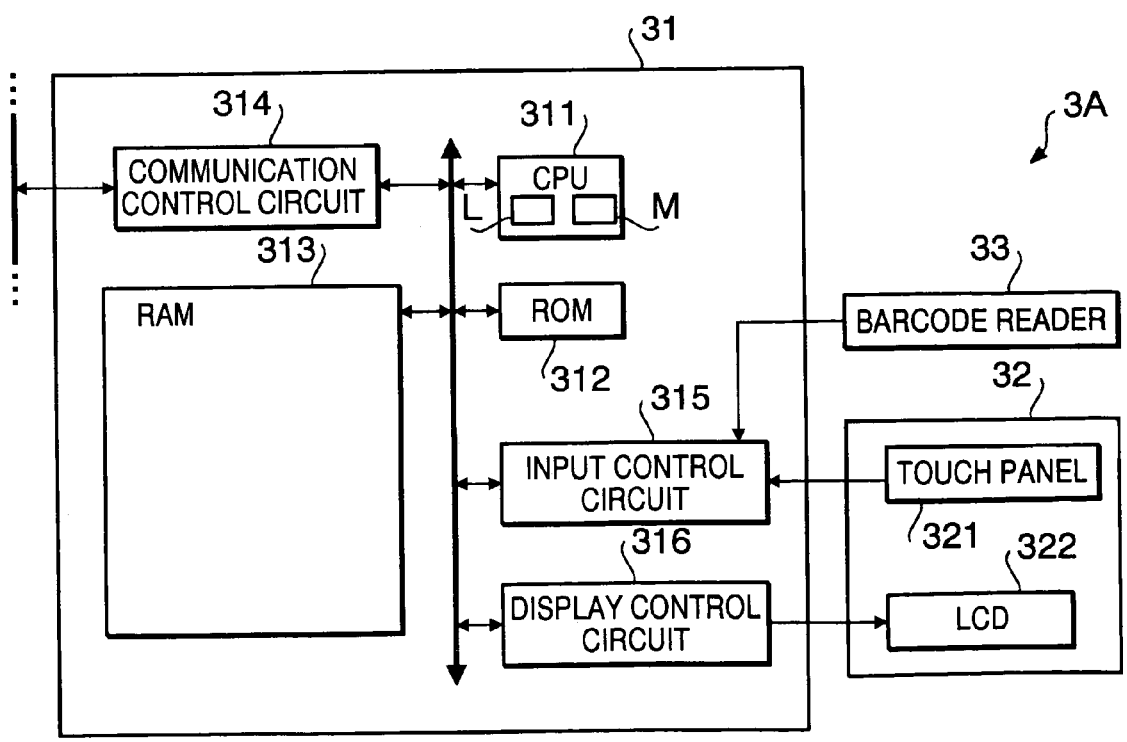
FIG. 5 is a block diagram showing a configuration of a terminal employed in the process management system according to the embodiment of the invention.

FIG. 5 is a block diagram showing a configuration of the terminal device 3A employed in the process management system 100 according to the embodiment of the invention. It should be note that the configuration of each of the other terminal devices 3B–3F is the same as that of the terminal device 3A. Therefore, only the terminal 3A will be described. As shown in FIG. 5, the terminal device 3A includes a PLC (programmable logic controller) 31, a display/input device 32 and a barcode reader 33.

The PLC 31 includes a CPU 311, a ROM 312, a RAM 313, a communication control circuit 314, an input control circuit 315 and a display control circuit 316, which are interconnected through a bus. The CPU 311 is provided with a clock M that measures time. With the clock M, it is possible to obtain a current time (year, month, date, time, minute, second). Further, the CPU 311 is provided with a counter L that counts usage of parts and a duration of time for producing a product. The ROM 312 stores various programs including a database program.

The display/input device 32 includes an LCD (liquid crystal display) 322 and a touch panel 321 provided on the LCD 322. The touch panel 321 is connected to the input control circuit 315 of the PLC 31, and the LCD 322 is connected with the display control circuit 315 of the PLC 31.

The barcode reader 33 is used for reading the box ID information provided to the box containing the parts/products in the form of barcode. The barcode reader 33 is connected to the input control circuit 315 of the PLC 31.

The CPU 311 of the PLC 31 retrieves the programs stored in the ROM 312 and develop the same in a predetermined area of the RAM 313. The CPU 311 controls the display control circuit 316 to display images on the LCD 322 of the display/input device 32. The images displayed on the LCD 322 include, for example, a carry-in button which is touched when a part is carried in for the process, a usage button which is touched when the process starts using the part, a producing button which is touched when the process starts producing the product, an end button which is touched when the usage of the parts is finished, a production finish button which is touched when production of the products is finished, a carry-out button which is touched when the produced products are carried out, an interruption button which is touched when the operator interrupts usage of the parts in the process and/or production of the products, and a restart button which is touched when the usage of the parts and/or production of the products is restarted after the interruption.

The operator can input necessary commands by touching the buttons displayed on the LCD 322. That is, positional information of the touched button is transmitted from the touch panel 321 to the input control circuit 315 of the PLC 31, thereby the CPU 311 detects which button is touched.

The operator may use the barcode reader 33 to read a barcode. The barcode reader 33 obtains barcode data when operated to read a barcode, and transmits the barcode data to the input control circuit 315 of the PLC 31. The PLC 31 temporarily stores the data in the RAM 313 of the PLC 31.

Each of the terminal devices 3A–3F configured as above is connected to the LAN 4 via the communication control circuit 314. The data temporarily stored in the RAM 313 is transmitted to the server 1 via the PC 2 and the LAN 4 and stored in the HDD 13 of the server 1.

Next, a relationship between a flow of parts/products in each process and data processing of the process management system 100 will be described. As described above, according to the embodiment, the parts/products are transferred from a process to another as being stored in a box.

The process management system executes various operations by making each box relate to a unit (one file) of management data. The management data is processed by the database program in the server 1 and the database program in each of the terminals 3A–3F.

Each piece of the management data is related to one ID information of a box that is transferred between two processes. In the box, products of one process (i.e., the preceding process) are stored. Then, the products stored in the box are treated as parts in the succeeding process. In association with this treatment of the parts/products, the management data includes data related to the preceding process, i.e., data when the objects stored in the box are regarded as the products (i.e., preceding process data), and data related to the succeeding process, i.e., data when the objects stored in the box are regarded as the parts (succeeding process data).

The preceding process data may includes:

data representing the name of the process in which the product is produced (i.e., the product process name data);

data indicating whether the contents of the box are defective or nondefective products (product box content data);

data indicating a time when the product is started to be produced (production start time data);

data indicating a time when the production of the product is finished (production end time data);

data indicating environment conditions (temperature/humidity) when the products are produced (production environmental condition data);

data indicating a time when the products are carried in the product storage (product carry-in time data);

data indicating a time when the products are transferred to the succeeding process (product carry-out time data)

data related to an operator who is in charge of production of the product (product charge-in person data);

data regarding defective products found in producing products (production defect data); and data indicating time consumed by the operator for producing the product (production time data).

It should be noted that the production process name data can be replaced with the name of the process in which the products are stored in the box, and that the production start time data can be replaced with the data indicating a time when the products are started to be stored in the box. Further, the production end time data can be replaced with data indicating a time when the products have been stored in the box.

According to the embodiment, the production period data is generated based on the counted value of the counter L of the CPU 311 from the touch of the production start button when the products are started to be produced to the touch of the production end button. Specifically, when the production start button is touched by the operator, the count value is incremented from its initial value of zero (0). If the interruption button is touched, the count value is fixed (i.e., incrementing is paused). When the restart button is touched, the count value is incremented from the current value, and when the production end button is touched, the count value is temporarily stored in the RAM 13 as the value corresponding to the production period data. The thus stored count value is converted by a predetermined program into the production period data. The increased amount of the count value represents a time period from the production start time to the production end time with the interrupted time period (e.g., a break for operators) being subtracted. Thus, the count value exactly corresponds to the time period required for producing the products. That is, the production period data corresponds to the time period for producing the product exclusively.

The defective product data includes various type of data, which includes:

accepted product number data indicating the number of the products which are produced in the process as acceptable products;

disqualified product number data indicating the number of products which are produced in the process as disqualified products;

held product number data indicating the number of the products which are produced in the process and are not determined whether they are accepted products or disqualified products;

adjustable product number data indicating the number of products which would be accepted if slight adjustment is made;

defective process group name data indicating the name (name group) of process(es) which produced the parts when the defective products are produced in the current process;

defective product number data indicating the numbers of defective products produced in the current process categorized by part groups;

defective item data indicating cause of the defective product; and defective product number data indicating the numbers of defective products categorized by defective items.

The succeeding process data includes:

part process name data indicating the name of the process in which the part was used;

part usage start time data indicating a time at which the part is started to be used;

part usage end time data indicating a time at which the part is finished to be used;

part carry-in time data indicating a time at which the part is carried in the carry-in storage;

part preparation time data indicating a time at which the part is carried in the usage storage;

part user data that is data related to the operator who used the part;

defective part data that is data related to defective part of which the defective is found during usage of the same; and part usage period data indicating a time period the operator has spent to use the part.

The part process name data may be replaced with name data of the process in which the part is picked up from the box. The part usage start time data may be replaced with data indicating a time when pick-up of part of the box is started. The usage end time data may be replaced with data when all the parts in the box have been finished.

According to the embodiment, the part usage period data is generated based on the counted value of the counter L of the CPU 311 from the touch of the part usage start button when the parts are started to be used to the touch of the part usage end button. Specifically, when the part usage start button is touched by the operator, the count value is incremented from its initial value of zero (0). If the interruption button is touched, the count value is fixed (i.e., incrementing is paused). When the restart button is touched, the count value is incremented from the current (fixed) value, and when the part usage end button is touched, the count value is temporarily stored in the RAM 13 as the value corresponding to the part usage period data. The thus stored count value is converted by a predetermined program into the part usage period data. The increased amount of the count value represents a time period from the part usage start time to the part usage end time with the interrupted time period (e.g., a break for operators) being subtracted. Thus, the count value exactly corresponds to the time period during which the part is used by the operator. That is, the production period data corresponds to the time period during which the part is used exclusively.

The defective part data includes:

accepted part number data indicating the number of parts used in the process as accepted parts;

disqualified part number data indicating the number of parts which were determined to be disqualified parts in the process;

defective item data indicating cause of the defect of the defective parts; and defective parts number (by item) data indicating the numbers of defective parts categorized by item.

By obtaining the defective product data and defective part data, the operator of the management system is capable of considering minute manufacturing plan taking a defective fraction in to account. Further, with such data, the operator can estimate occurrence of defective parts/products, consider remedial action with respect to the process in which the defective parts/products are found. Furthermore, with such data, early recognition of the defective parts/products can be realized.

As objects (parts/products) are moved among the processes as well as in each process, in accordance with the flow of the objects, corresponding management data is updated within the process management system. The procedure for updating the management data will be described with reference to a flowchart shown in FIG. 6.

The procedure will be described referring to an example shown in FIG. 2. As aforementioned, process C accepts the objects (products) transferred from process A as the parts for process C as well as the objects transferred from process B. The products produced in process A are, for example, stored in boxes with barcodes indicating individual ID information (e.g., a1, a2, a3, . . . ), respectively, and then transferred to process C while stored in the boxes. In the following description, a box with the ID information "a1" will be referred to as the box a1 (the other boxes will also be referred to in the same manner).

Figure 6:
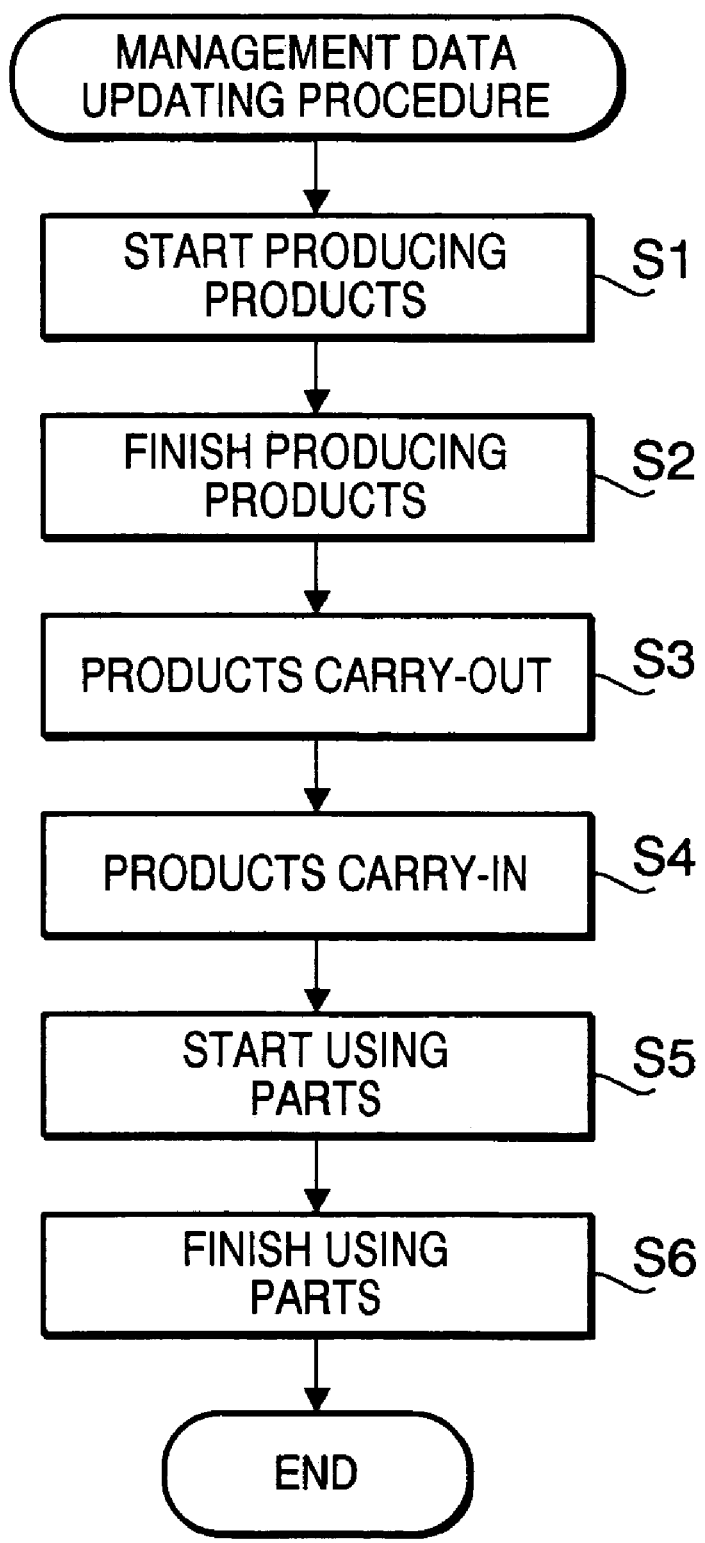
FIG. 6 is a flowchart illustrating a management data updating procedure executed in the process management system according to the embodiment of the invention.
Figures 9, 10:
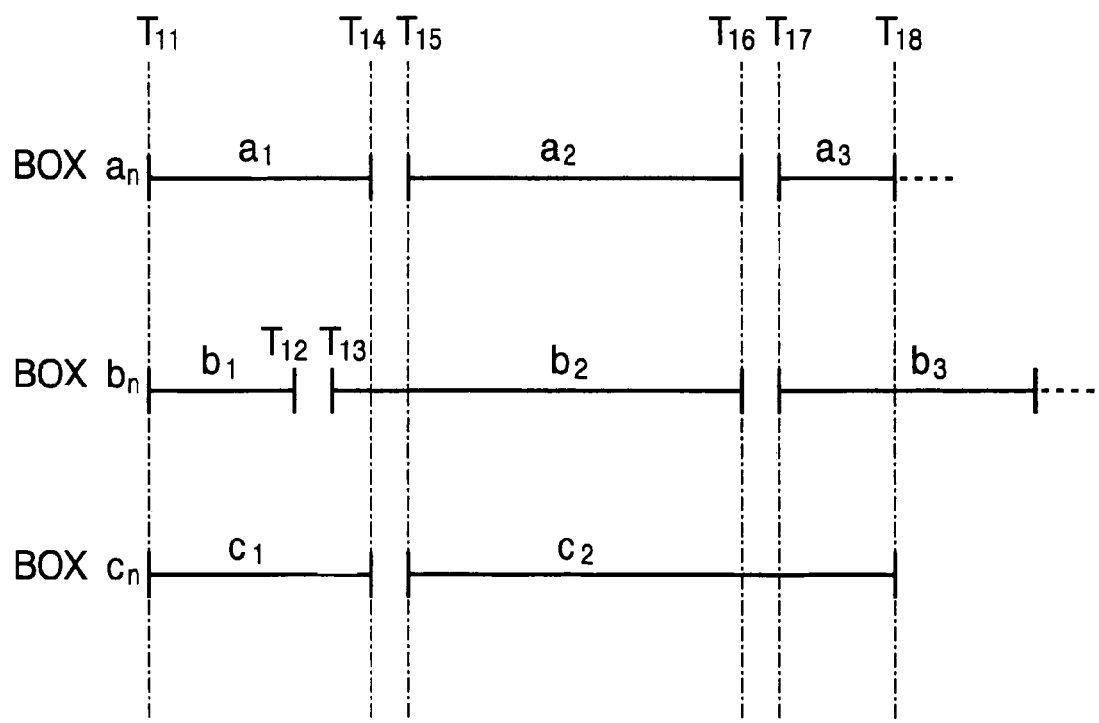
FIG. 9 shows a table which is finally created in the process management system according to the embodiment of the invention.
FIG. 10 is a chart showing manufacturing of parts and product in C process in a chronological order.

FIG. 6 is a flowchart illustrating a management data updating procedure executed in the process management system. FIGS. 7A–7C show tables schematically illustrating management data corresponding to steps S1–S3 of the flowchart, and FIGS. 8A–8C show tables schematically illustrating management data corresponding to steps S4–S6 of the flowchart. FIG. 9 shows a table which is finally created in the process management system. With reference to FIGS. 6–9, an exemplary procedure for updating the management data related to box a1 will be described.

In S1, production of a product is started in process A. The operator selects boxes containing the parts to be used and another box in which the produced products are stored. Specifically, the operator selects boxes containing objects which are used as parts for process A from among a plurality of boxes, one for each part. Then, barcodes adhered to the selected boxes are read using the barcode reader 33. The operator also selects a box for the products produced in process A, and reads the barcode thereon with the barcode reader 33. After the above operation related to the boxes, the operator selects other boxes also containing the parts to be used and another box in which the products are stored, and reads the barcodes thereof. The box-related operation above is repeated until the barcodes on all the boxes are read. In the following description, for the sake of brevity, the operation for only box a1 will be described. Further, operation for the box in which the products are stored will be described later and will not describe with reference to FIG. 6.

On box a1, a barcode indicating box ID information, product process name data D1 (e.g., process A) and containing product data D2 (e.g., acceptable product) is adhered. The product process name data D1 may be data of the name of the process in which the product is produced and stored in the box, and containing product data D2 may be data indicating which one of acceptable product, unqualified product and undecided product. The data read by the barcode reader 33 is stored, for example, in the RAM 313 of the terminal 3A.

It should be noted that the product process name data D1 is identical to part process name data (which will be described later) assigned to a box containing objects which will be stored as parts in process A. Therefore, in the management data D including the product process name data D1 includes "process C" as the part process name data.

After the above data has been input through the terminal 3A using the barcode reader 33, the operator operates the touch panel 321 to further inputs data in the terminal device 3A. The data input through the touch panel 321 includes:

operator data D3 indicating an operator in charge of production of the products in process A;

environmental data D4 indicating temperature/humidity data when the products are produced in process A;

production start time data T1 which is a time when the production of the products in process A is started (which is the time when the operator touched the production start time button, and stored in the RAM 313).

As above, when the production of products is started in process A, the pieces of data D1–D4 and time data T1 are stored in the RAM 313 (see FIG. 7A). It should be noted that the above procedure may be modified such that the time when the data D3 or D4 is input to the terminal device 3A is obtained using a built-in clock, which time may be stored as the time data T1 in the RAM 313, regarding the input of operator data D3 or environment data D4 as a trigger of the product producing operation. Further optionally, the operator data D3 may be input once when the operator starts ;using the terminal device 3A, and the input data is used in the following procedures instead of inputting the same every time.

The operator data D3 may be used to compare data with other data which also has assigned person data or part user data in order to evaluate a production capability of the operator of process A.

For example, it is possible to obtain a productivity (the number of products per a unit time period) of each operator of each process based on the management data. In another case, if a product is regarded as an acceptable part in process A and the same product is regarded as a defective product in process C, there is a possibility that one of the decisions in process A and process C might be wrong. When an investigation is carried out and it becomes clear that one of the decisions in processes A and C is wrong, it is possible to identify the operator who has made the mistake.

Using the operator data D3 as above, it is possible to manage the performance of each operator and urges the operator to improve the efficiency. Further, it is also possible to evaluate the amount of work based on the labor hours and the number of products. Furthermore, it is possible to determine whether an operator is in a bad condition if, for example, the productivity of the operator is significantly lowered.

The environmental data D4 represents the environmental condition when a product is acceptable or defective. In particular, the environmental data D4 can be useful when the cause (e.g., temperature, humidity etc.) of the defectiveness is analyzed.

Time data such as the production start time data T1 is used for various analyses including the number of products produced per unit time, tracing information, lead time, defectiveness analysis and the like.

After data D1–D4 and time data T1 are input to the terminal device 3A, the operator start producing the products in process A. Every time when the operator puts the produced product in box a1, the operator inputs a condition of the product in the terminal device 3A through the touch panel 321.

If box a1 is for containing the acceptable products, the operator operates the touch panel 321 to input that an acceptable products is put into box a1. With this operation, when box a1 is filled with the products, the total number of the acceptable products can be known. It should be noted that, in order to store the acceptable products, defective products and undetermined products, three boxes should be prepared. In this description, for the brevity, only one box (a1) is described.

If box a1 is for containing defective products, the operator stores the defective product in box a1 and operates the touch panel 321 so that the terminal device 3A operates in a predetermined mode for processing the defective products.

The data regarding the defective product which is produced in process A includes the defective item data. In this case, the number of the defective products produced in process A, the number of defective items which are the cause of the defectiveness of the defective products in process A are stored in the terminal device 3A.

If box a1 is for storing the undecided products, the terminal device 3A operates in another predetermined mode for processing the undecided products.

If box a1 is for storing the adjustable products, the terminal device 3A operates in another predetermined mode for processing the adjustable products.

When the production of the products in process A has been finished (products having been stored in box a1), the operator touch the production end button on the touches panel 321 (S2). Then, the operated time is stored in the RAM 313 as the production end time (production end time data T2). The total number of acceptable products, which have been counted, is stored in the RAM 313 as the acceptable products number data D5 (see FIG. 7B).

Based on the thus collected data (i.e., production end time data T2, production start time data T1, acceptable number data D5, defective product number data, undecided product number data, and adjustable product number data, the number of product par unit time can be calculated.

When the production of products in process A is finished, box a1 is placed in the produced product storage as a stock. The time when the products (i.e., box a1) are placed in the produced product storage (i.e., product carry-in time data T3) is stored in the RAM 313. If the latest time data of the management data D related to box a1 is the product carry-in time data T3, it is known that box a1 is located in the produced product storage. Thus, the product carry-in time data T3 serves as data indicative of a current location of box a1.

If the products produced in process A are requested by process C, the operator of process A moves box a1 from the produced product storage to a product carry-out storage. That is, the products are transferred to process C (S3). At this stage, the operator touches the carry-out button of the touch panel 321 to input the time, which is obtained by the built-in clock, when box a1 is transferred toward process C (i.e. the product carry-out time data T4) and stores the product carry-out time in the RAM 313 of the terminal device 3A (see FIG. 7C).

The data D1–D5 and time data T1–T5 temporarily stored in the RAM 313 represents data when the objects stored in box a1 are considered as the products, and is related to process A. Such data will be referred to as box a1 <product> data in the following description. When the product carry-out time data T4 is stored in the RAM 313, box a1 leaves process A. Therefore, at that stage, the management data D which only contains box a1 <product> data is transmitted to the server 1 via the PC 2 and LAN 4, and is stored in the HDD 13 as a single file.

When box a1 carried out from process A is carried in the part carry-in storage of process C (S4), the operator of process C operates updating procedure of the management data D, which is the data related to box a1, using the terminal device C corresponding to process C. It should be noted that, since the configuration is similar to that of the terminal device A, the terminal device C will not be described for the brevity. In the following description, the same reference numbers as those for the terminal device A are assigned to components of the terminal device C but a suffix "c" is added to each reference number so that it can be distinguished from that of the terminal device A easily.

When box a1 is placed in the part carry-in storage for process C, the operator inputs a time (part carry-in time data T5) when box a1 is carried in the part carry-in storage by touching the carry-in button of the touch panel 321c of the terminal device C, which is stored in the RAM 313c of the terminal device C (see FIG. 8A). If the latest time data of the management data D related to box a1 is the part carry-in time data T5, it is known that box a1 is located in the part carry-in storage. Thus, the part carry-in time data T5 serves as data indicative of a current location of box a1.

Further, by calculating a difference between the part carry-in time data T5 and product carry-out time data T4, a lead time in delivering the parts from process A to process C can be obtained. The lead time as calculated may be stored in the management data for process A and/or process C together with other data related to box a1.

When the production of the products is prepared in process C, the operator moves box a1 located in the part carry-in storage to the part usage storage. At this time, the operator stores the time when box a1 is moved to the part usage storage (i.e., part preparation time data T6) in the RAM 313c by operation the touch panel 321c.

When the products are produced in process C (S5), the operator of the process C selects boxes containing the parts to be used in process C (i.e., one from boxes containing the products of process A, and one from boxes containing the products of process B), and read the barcodes provided to the selected boxes using the barcode reader 33c of the terminal device 3C. Then, operator of process C reads the barcodes of boxes containing the products produced in process C.

As described above, box a1 is provide with the barcode carrying the ID information a1, product process name data D1, product content data D2, and data indicating the process in which the objects in the box a1 are used as parts (i.e., part process name data D6; in this case, process C). The data read by the barcode reader 33c is stored in the RAM 313c.

The part process name data D6 is identical to the product process name data assigned to a box for containing the products produced in process C. That is, in this example, both the part process name data and product process part name data is data representing "process C".

The operator inputs the above data using the barcode reader 33c to the terminal device 3C, and further inputs data to the terminal device 3C by operating the touch panel 321c. The data to be input at this stage includes:

part user data D7 which indicates the user of the part in process C;

part usage start time data T7 which represents the time when the part is started to be used in process C (which is stored in the RAM 313c when the usage start button is operated).

As above, when the part is started to be used in process C, in the RAM 313c, the data D6, D7 and time data T5, T6 and T7 are stored (see FIG. 8B). It should be noted that the above procedure may be modified such that the time when the data D7 is input to the terminal device 3C is obtained and stored as the time data T7 in the RAM 313c, regarding the input of operator data D7 as a trigger of the start of the usage of the part.

The part user data D7 may be used to compare data with other data which also has person in charge of product data or part user data in order to evaluate a production capability of the operator of process C.

Using the operator data D7 as above, it is possible to manage the performance of each operator and urges the operator to improve the efficiency. Further, it is also possible to evaluate the amount of work based on the labor hours and the number of products. Furthermore, it is possible to determine whether an operator is in a bad condition if, for example, the productivity of the operator is significantly lowered.

When the data D6, D7 and time data T5, T6 and T7 are input to the terminal device 3C, the operator starts using the parts in process C. When the operator picks up each part from box a1, the user operates the touch panel 321c to input the condition of the part in the terminal device 3C.

The condition of the part is data related to the defective parts contained in box a1. Such data includes acceptable part data D8 indicating the number of parts used as the acceptable parts in the process, the number of disqualified part data D9 indicating the number of the parts determined to be defective parts, defective item data D10 indicating the items which are causes of the defectiveness, and the number of defective data by item D11, which represents the number of defective parts by items.

When the usage of the parts in process C is finished (S6), and the operator touches the touch panel 321c (i.e., the usage end button is operated), the time of operation is stored in the RAM 313c as the usage end time data T8 of the part in process C. The data D8–D11 are also stored in the RAM 313c (see FIG. 8C).

The data D6–D11 and time data T5–T8 temporarily stored in the RAM 313c represent data when the object stored in the box a1 are regarded as the parts. Such data will be referred to as box 1a <part> data. In this example, the data stored in the RAM 313c is related to process C. When the part usage end time data T8 is stored in the RAM 313c, the role (for storing/transferring the objects) of box a1 finishes. Therefore, a piece of management data which includes only the box a1 <part> data is transmitted to the server 1 via the LAN 4, and only the management data D which contains only the box a1 <product> data is updated. As is shown in FIG. 9, finally, the management data D is stored in the HDD 13 as a single file including both the box a1 <product> data and box a1 <part> data.

As described above, according to the process management system, ID information is assigned to each box that contains objects and is transferred between two processes, and every time when an operation related to the box is executed, various pieces of data related to the ID information are collected. Then, the collected pieces of information are stored in the server 1 as a single file. Therefore, in thee server, files relates to links among the processes are accumulated. Because of this characteristic data structure, when the user wishes to obtain connection information between a desired pair of processes, only one file is necessary.

According to another aspect, it should be noted that a recording medium (e.g., HDD 13) contains the above-described process management data. The process management data is configured such that defective object data when the objects are regarded as products in the current process, and defective object data when the objects are regarded as parts in the succeeding process are included in a single file. Therefore, if there is inconsistency between the defective product information and defective part information in the same file, the inconsistency can be found quickly. Therefore, by configuring the management data to have such a data structure, the defectiveness analysis can be accelerated.

When a tracing operation is executed by use of the product management system according to the embodiment, the CPU 11 of the server 1 searches data indicative of a time during a time period when the products are being produced (which corresponds to a time period from time data T1 to T2), and data indicative of a time during a time period when the parts are being used (which corresponds to a time period from time data T7 to T8) in the management data which is stored in the HDD 13 and corresponds to the respective boxes.

If a time at which the product is being produced of the management data including the product data related to a certain process, and a time at which a part of the management data having the part data related to the process have overlapped portion, the boxes respectively related to the pieces of management data are used at the same time in the same process. Therefore, by detecting the overlapped time period, it is possible to identify from which parts (i.e., boxes) a product contained in a certain box is produced. That is, according to the process management system described above, an object can be identified by the unit of box, and thus enables detailed traceability of the objects.

According to the process management system, only the server 1 has information regarding all the processes of the system. Each process (i.e., each operator) recognizes only the information of the process itself. If wrong data related to the object is input in one of the processes, there occurs inconsistency before and after the process. Thus, the server 1 can detect the erroneous data input in the process quickly, and let the process (i.e., the operator) correct the data. As a result, reliability of the data for each process is improved.

Further, according to the process management system, an enhanced version of tracing can be performed. In the enhanced tracing, property (e.g., a ratio of defective products) of a product group (i.e., the products in the box) produced in a certain process can be investigated.

FIG. 10 is a chart showing usage of parts and production of the product in process C in chronological order. A ratio R of the products which are produced using the parts in box b1 with respect to the products contained in box c1 is calculated by the CPU 11 as follows.

A graph labeled with "box an" shows the usage of the parts stored in boxes a1, a2, a3, . . . by process C in chronological order. Each solid line indicates the usage (from start to end) of the parts an. Similarly, a graph labeled with "box bn" shows the usage of part stored in boxes b1, b2, b3, . . . by process C in chronological order, and a graph labeled with "box cn" shows the usage of part stored in boxes c1, c2, c3, . . . by process C in chronological order.

At time $T_{11}$, use of the parts contained in boxes a1 and b1 is started. Thus, time $T_{11}$ coincides with the usage start time data. Further, time $T_{11}$, is the start time when production of the product to be stored in box c1 is started. Therefore, time $T_{11}$ coincides with the product production start time data.

At time $T_{12}$, usage of the parts in box b1 is finished. Time $T_{12}$ therefore coincides with the part usage end time data of box b1. Since the usage of the parts in box b1 is finished, until the parts contained in box b2 are started to be used (at time $T_{13}$), production of the products which are to be stored in box c1 is temporarily interrupted. As described above, the interruption button is operated at time $T_{12}$, and counting of the counter L is also interrupted until the restart button is operated at time $T_{13}$.

At time $T_{13}$, use of the parts stored in box b2 is started. Therefore, time $T_{13}$ coincides with the part usage start time data of box b2. Since the parts necessary for producing the products have become available, the restart button is operated and the counter L operates to continue counting up of time.

At time $T_{14}$, usage of the parts stored in box a1 is finished. Therefore, time $T_{14}$ coincides with the part usage end time data of box a1. In this example, time $T_{14}$ is also a time when the production of the products stored in box c1 is finished. Thus, time $T_{14}$ coincides with the production end time data.

At time $T_{15}$, usage of the parts stored in box a2 is started. Therefore, time $T_{15}$ coincides with the part usage start time data of box a2. Further, in this example, time $T_{15}$ is the time when the storage of the products to be stored in box c2 is started. Therefore, time $T_{15}$ coincides with production start time data.

At time $T_{16}$, usage of the parts stored in boxes a2 and b2 is finished. Therefore, time $T_{16}$ coincides with the part-usage end time data of boxes a2 and b2.

At time $T_{17}$, usage of the parts stored in boxes a3 and b3 is started. Therefore, time $T_{17}$ coincides with the part usage start time data of boxes a3 and b3.

At time $T_{18}$, usage of the parts stored in box a3 is finished. Therefore, time $T_{18}$ coincides with the part usage end time data of box a3. In this example, time $T_{18}$ is also a time when the production of the products stored in box c2 is finished. Thus, time $T_{18}$ coincides with the production end time data.

The CPU 11 calculates the ratio R bases on a time period consumed for usage of the parts stored in box b1 with respect to a time period consumed for producing the products stored in box c1. The production period in this embodiment is a period from the production start time to the production end time (i.e., an absolute value of production start time–production end time) with the interruption period(s) (i.e., an absolute value of interrupted time-restart time) being subtracted.

Further, the usage time period of the parts in each box is a period from the usage start time to the usage end time (i.e., an absolute value of usage start time-usage end time). It should be noted that, if there is a break during the usage time, it should be taken into account to determine the usage time period.

The ratio R is calculated as (usage time period)/(production time period) and is calculated in accordance with equation (1) below.

$$R = \frac{T_{12} - T_{11}}{|(T_{14} - T_{11}) - (T_{13} - T_{12})|}, \quad (1)$$

where, $T_{14} > T_{13} > T_{12} > T_{11}$.

For example, if $T_{11}$–$T_{14}$ are 13:00, 13:40, 13:50 and 14:00, respectively, the usage time is 40 minutes and the production time is 50 minutes. In such a case, the ratio R of the product group produced using the parts in box b1 is 0.8. That is, if the tracing of the parts in box b1 related to the products in box c1 is performed, it is know that 80% of the products in box c1 are produced using the parts stored in box b1.

When the above calculation is performed, for example, time $T_{11}$ is set to 0, $T_{12}$ is set to 40, $T_{13}$ is set to 50 and $T_{14}$ is set to 60. The calculation result is displayed, for example, on the CRT 17. When the above tracing operation is executed, the operator designates processes, products, parts and/or boxes subject to the tracing through the keyboard 18.

Similar to the above, if the tracing of the parts in box a1 related to the products in box c1 is performed, the ration R is 1 (i.e., 100%). That is, 100% of the products in box c1 are produced using the parts stored in box a1.

Since the tracing operation described above is available, it is possible to calculate a ratio R of the parts in a designated box to the products in the predetermined box. In other words, it is also possible to calculate the ratio of the defective products to the products stored in box c1.

Assuming that box b2 stores defective parts and is used for producing the products in process C, if the above tracing operation is executed, not only whether the defective parts are used in the product stored in box c1 but a ratio of the defective products (20% in this example) can be calculated. For each box containing the products (and therefore possibly including defective products that use the defective parts stored in box b2), the tracing operation is executed and ratios of the defective products in each box can be calculated. Therefore, in such a case, the operator can assign priority to the boxes containing the products, and apply necessary modification efficiently.

It should be noted that the invention should not be limited to the above-described exemplary embodiment, but can be modified in various ways without departing from the scope of the invention.

In the above-described example, since the number of parts stored in box b1 is greater than the capacity of box c1 (i.e., the number of products), the interruption has occurred. In another case, the number of parts stored in box b1 may be greater than the capacity of box c1 and an interruption occurs with respect to the usage of the parts stored in box b1. Further, the number of the parts stored in box a1 is less than the number of parts stored in box b1 or less than the capacity of box c1, a further interruption period related to box b1 or c1 may occur.

Further, according to the embodiment, the ratio R of specified parts to specified products produced in process C is calculated. This is only an example and a ratio of desired parts to desired products can be calculated. For example, a ratio of the parts which are products produced in process A and predetermined parts are used therein with respect to the products produced in process F can be calculated. In this case, CPU 11 first executes, in process A, an operation to calculate a ratio of specified parts to the products produced in process A. It should be noted that the products of process A are used as parts in process C. For convenience, the products of process A will be referred to as parts A. Next, the CPU 11 calculates a ratio of products A to the products of process C. It should be noted that the products of process C are used as parts in process F. For the convenience, the products of process C will be referred to as parts C. Finally, a ratio of pats C to the products of process F is calculated. As above, based on connection information between successive processes, tracing paths of the object can be determined and ratios can be calculated with tracking back the paths. Thus, according to the above described method, the tracing of the parts which were produced at a process a plurality of steps earlier.

According to the embodiment, when the tracing of a product group in a box is carried out, a ratio of predetermined parts in a predetermined box to a predetermined product group produced in a predetermined process.

Optionally, it is possible to calculate the ratio of the parts in a plurality of boxes to the products in a certain box in a certain process. For example, the tracing of each of the boxes bn (n being an integer) used for producing the products in box c1 can be performed. If such a tracing is executed, the result would be 80% regarding the parts stored in box b1 and 20% regarding the parts stored in box b2. That is, 80% of the products in box c1 use the parts stored in box b1, and 20% of the products in box c1 use the parts stored in box b2.

In the embodiment, usage time and production time, which are the time periods actually consumed for respective operations, are used to calculate the ratios described above. However, if the interrupted period is relatively short in comparison with the time period from the start to end of the production (or from the start to end of usage of the parts), the above ratio can be obtained simply by dividing the difference between the usage start time and the usage end time (absolute value) with the difference between the production start time and the production end time (absolute value).

In the above-described exemplary embodiment, the operation to produce a product from parts is defined as a process, and a group of parts transferred among the processes are defined as boxes. It should be noted that the invention need not be limited to this configuration and by replacing "object", "process", "product", "part" and "box" with appropriate items, the invention can be applied to other fields such as a field of economy, distribution, and the like.

It should be noted that "object" described above is described as a corporeal object. However, the invention should not be limited to the corporeal object, and incorporeal object can be managed with this system. Further, the "process" could be replaced with any operation applied to the object. The product can be anything produced as a result of the process or operation, and the part could be anything used for obtaining the product. Thus, the part need not be the components of the products. Furthermore, the "box" should not be a physical substance transferred between the processes, but can be conceptual (virtual) "box", a group of electrical data, and the like.

With appropriate substitution as described above or a further modification, the process management system described as the exemplary embodiment can be applied to process management systems that manage various types of objects including corporeal objects such as meat, and incorporeal objects such as economical or business matters.

The present disclosure relates to the subject matter contained in Japanese Patent Application No. 2004-065580, filed on Mar. 9, 2004, which is expressly incorporated herein by reference in its entirety.

What is claimed is:

1. A process management system configured to have a plurality of processes, each process producing a group of products from at least one kind of parts by applying a predetermined operation, the plurality of processes being hierarchically connected so that a final product is obtained from a plurality of parts, the process management system comprising:
   a data generating system that generates part data and product data, the part data being data related to connection information representing a connection between an upstream process and a downstream process, the part data including at least usage time data representing a time the part is used in the downstream process for obtaining the product of the downstream process, the product data being data related to the connection information and including production time data representing a time having been consumed for obtaining the product; and
   a ratio calculating system that calculates a ratio of the products obtained with use of the parts to the group of products in accordance with the production time data and the usage time data.

2. The process management system according to claim 1, wherein the part data includes property data representing a property of the part.

3. The process management system according to claim 1, wherein the product data includes property data representing a property of the product.

4. The process management system according to claim 1, further including a designating system operable by an operator to designate part and product,
   wherein the ratio calculating system calculates a ratio of the designated products obtained with use of the designated parts to the group of the designated products.

5. A process management system configured to have a plurality of processes, each process producing a group of products from a plurality of kinds of parts by applying a predetermined operation, the plurality of processes being hierarchically connected so that a final product is obtained from a plurality of parts, the process management system comprising:
   a data generating system that generates part data and product data, the part data being data related to connection information representing a connection between an upstream process and a downstream process, the part data including at least usage times data respectively representing times the plurality of kinds of parts are used in the downstream process for obtaining the product of the downstream process, the product data being data related to the connection information and including production time data representing a time having been consumed for obtaining the product; and
   a ratio calculating system that calculates ratios of the products obtained with use of the plurality of kinds of parts to the group of products, respectively, in accordance with the production time data and the usage time data.

6. The process management system according to claim 5, wherein the part data includes property data representing properties of the plurality of kinds parts, respectively.

7. The process management system according to claim 5, wherein the product data includes property data representing a property of the product.

8. The process management system according to claim 5, further including a designating system operable by an operator to designate a product,
   wherein the ratio calculating system calculates a ratio of the designated products obtained with use of each of the plurality of kinds of parts to the group of the designated products.

9. A process management system configured to have a plurality of processes, each process producing a group of products from at least one kind of parts by applying a predetermined operation, the plurality of processes being hierarchically connected so that a final product is obtained from a plurality of parts, the process management system comprising:
   a data generating system that generates part data and product data, the part data being data related to connection information representing a connection between an upstream process and a downstream process, the part data including at least a usage start time data representing a time at which the downstream process starts using the part for obtaining the product of the downstream process and a usage end time data representing a time at which the usage of the parts in the downstream process is finished, the product data being data related to the connection information and including production start time data representing a time at which the downstream process starts obtaining the product and production end time data representing a time at which the downstream process finishes obtaining the product; and
   a ratio calculating system that calculates a ratio of the products obtained with use of the parts to the group of products in accordance with the production start time data, end time data, usage start time data and usage end time data.

* * * * *